United States Patent [19]
Shalavina et al.

[11] 3,988,150
[45] Oct. 26, 1976

[54] PROCESS FOR EXTRACTION OF GALLIUM FROM SODIUM ALUMINATE LIQUORS

[76] Inventors: Elena Leonidovna Shalavina, ulitsa Vinogradova, 33, kv. 20; Elizaveta Ivanovna Ponomareva, ulitsa Furmanova, 51, kv. 24; Arkady Ivanovich Zazubin, ulitsa Vinogradova, 33, kv. 20; Tatyana Dmitrievna Ostapenko, ulitsa Mira, 144, kv. 57, all of Alma-Alta; Galina Artemievna Ivanova, ulitsa Shexpira, 3, kv. 5, Donetsk; Gennady Alexeevich Romanov, ulitsa Astronomicheskaya, 63, kv. 18, Alma-Alta; Evgeny Nikolaevich Bespalov, ulitsa Karpenko, 23, kv. 39, Nikolaev; Igor Vladimirovich Prokopov, ulitsa Dzerzhinskogo, 43, kv. 27, Pavlodar; Boris Stepanovich Povazhny, ulitsa Tsiolkovskogo, 4, kv. 14, Pavlodar; Boris Alexeevich Smirnov, ulitsa Sverdlova, 16, kv. 18, Pavlodar; Viktor Nikolaevich Vasiliev, ulitsa Sverdlova, 16, kv. 8, Pavlodar; Salavat Ishanovich Turakbaev, ulitsa Sverdlova, 16, kv. 8, Pavlodar; Askar Minliakhmedovich Kunaev, ulitsa Vinogradova, 20, kv. 7; Turar Baltabaevich Tursunbaev, prospekt Lenina, 70, kv. 19, both of Alma-Ata, all of U.S.S.R.; Viktor Dmitrievich Ponomarev, deceased, late of Alma-Ata, U.S.S.R., by Elizaveta Ivanovna Ponomareva, administratrix

[22] Filed: Oct. 3, 1975
[21] Appl. No.: 619,500

[52] U.S. Cl. .................. 75/109; 75/121; 423/65; 423/127; 423/131
[51] Int. Cl.² .......................... C22B 58/00
[58] Field of Search .............. 75/109, 121; 423/127, 423/131, 65

[56] References Cited
UNITED STATES PATENTS

| 3,094,378 | 6/1963 | Wolf | 75/121 X |
| 3,170,857 | 2/1965 | Dotzer | 75/121 X |

Primary Examiner—G. Ozaki
Attorney, Agent, or Firm—Holman & Stern

[57] ABSTRACT

A process for the extraction of gallium from sodium aluminate liquors comprises extracting gallium from aluminate liquors by cementation with the aid of a liquid gallium-aluminum alloy. Aluminate liquors produced in the Bayer process, prior to cementation, are freed from various impurities. To this end, the recycle aluminate liquor is cooled to a temperature at which soda crystallizes and vanadium is retained in the liquor, whereupon the crystallized precipitate is separated, while the residual liquor is mixed with the mother aluminate liquor in the ratio of 0.1–1 to 1–0.1. The resultant liquor is cooled down to ambient temperature, and the vanadium precipitate is separated. The process is a major step towards a simpler technique of gallium extraction from aluminate liquors both high and low in gallium. Also, the process permits extracting, directly from aluminate liquors, gallium in a higher degree of purity than can be obtained in the prior art. Furthermore, the process enables valuable vanadium compounds to be recovered from liquors alongside gallium.

12 Claims, No Drawings

PROCESS FOR EXTRACTION OF GALLIUM FROM SODIUM ALUMINATE LIQUORS

BACKGROUND OF THE INVENTION

The present invention relates to rare-element metallurgy; more specifically, it is directed to processes for extraction of gallium from sodium aluminate liquors.

The process of this invention is sure to find wide application in alumina production. The valuable specific properties of gallium account for its soaring popularity in nuclear power engineering, semi-conductor instrument making and rocket engineering.

All currently known techniques of gallium extraction from sodium aluminate liquors depend on the type of process for the production of sodium aluminate liquors which, in turn, depends on the grade of the alumina-containing material.

The Bayer technique of bauxite processing consists, first, in decomposing the feedstock with sodium hydroxide solutions (recycle sodium aluminate liquors), with most of the gallium passing into the sodium aluminate liquors. The latter decompose, and, the aluminum hydroxide precipitate having been separated, most of the gallium remains in the mother liquor. The mother liquor is partially evaporated to become a recycle liquor which is directed to leach a fresh batch of bauxite.

The mother and recycle liquors obtained in the Bayer process serve as feedstock in gallium production.

The so-called "red sludge" produced in the decomposition of bauxite with a sodium hydroxide liquor contains some 0.002% gallium by weight. In order to reduce the losses of gallium, the "red sludge" is subjected to sintering, the sintering mother liquor produced thereby likwise presenting a potential source of gallium.

It is known in the art to extract gallium from the sodium aluminate liquors produced in the Bayer process by electrolysis in mercury cathode cells.

Essentially, this technique consists in the following: the feedstock sodium aluminate liquor is decomposed and then subjected to electrolysis on a mercury cathode and a nickel anode at a temperature of from 40° to 70° C., a cathode current density of from 0.35 to 0.45 amp/sq.in., an anode current density of from 10 to 12 amp/sq.in., and a cathode potential of 1.9 v. In the course of electrolysis, gallium is reduced on the cathode and diffused into the metal mass with stirring. The electrolysis goes on for 24 hours to produce a 0.5–1.0 percent gallium amalgam, for the solubility of gallium in mercury at a temperature of 50° C. is 1.5% by weight. The amalgam is decomposed with a sodium hydroxide solution by heating to the point of boiling. The level of gallium in the sodium hydroxide solution reaches 30 to 80 g/lit. This solution is subjected to gallium electrolysis in a vessel with a solid steel (or nickel) cathode or a liquid gallium cathode. The resultant metallic gallium usually contains a large amount of zinc, lead, iron, nickel and copper impurities.

The gallium current yield in the mercury cathode cell never exceeds 5.35% by weight, since most of the current is used up for impurity reduction and hydrogen evolution.

So, it takes up to 3 tons of mercury to produce 1 kilogram of gallium according to the technique described. In order to cut down on the mercury consumption, Landi from Italy developed an improved electrolysis celll incorporating a rotary cathode formed as a hollow drum coated on the external surface thereof with a thin layer of mercury.

At a cathode current density of 0.45 amp/sq. dm., 0.04 kg of gallium can be produced on one square meter of the drum surface within 24 hours, the gallium current yield being 2.8 percent and the power consumption rate being 155 Kwt.hr. per 1 kg of gallium (see: "Aluminio" Journal, 1959, No. 5, pp. 219–24, Italy).

The latter known method has some serious disadvantages:

the electrolysis cell with the rotary mercury cathode is undesirably sophisticated;

the mercury consumption rate is still excessively high, 2 kg per 1 kg of gallium;

a lot of mercury is wasted in sludge; and the most serious disadvantage of the process is its very low gallium current yield.

As compared with the latter process, the method of producing gallium by cementation with the aid of a sodium amalgam is more efficient.

The cementation process is more effective than direct electrolysis on a mercury cathode, too.

However, both of these two types of processes have serious drawbacks:

the mercury vapors are toxic;

a high proportion of mercury is lost in the sludge;

the probability of contamination of the sodium aluminate liquors with mercury is high;

the low solubility of gallium in mercury requires large quantities of mercury to be processed; and finally, the mercury electrolysis and sodium amalgam cementation methods are actually nothing else than techniques for gallium concentration which must be followed by at least another two operations, viz. (a) separation of the gallium from the amalgam; and (b) final electrolysis of the concentrated gallate solutions to produce metallic gallium.

It is likewise known in the art to produce gallium by electrolysis on flat steel cathodes from gallate solutions obtained by dissolving a gallium concentrate.

According to literary data, at a cathode current density of 0.07 amp/sq.m. and an electrolysis time of 5.5 days, the degree of gallium extraction from the solution averages 86.7% by weight and the residual concentration of gallium in the solution is 0.336 g/lit.

The solid electrodes also show considerable drawbacks: passivation of the electrode surface requiring longer electrolysis times; contamination of gallium with the electrode material; and the difficulties involved in attempts to automate the process.

Gallium electrolysis on a liquid gallium cathode is more effective than the solid cathode process. Gallium electrolysis from pure sodium gallate solutions on a liquid gallium cathode and a nickel anode shows a current efficiency of from 40 to 50 percent (see, for example, G.D.R. Pat. No. 27,024.).

The liquid gallium cathode method offers several advantages over the solid cathode technique which stem from the fact that the liquid cathode is easier to agitate, thereby eliminating concentration limitations and minimizing cathode passivation; this also enables the process to be rigorously conducted at a predetermined set of optimal conditions since the electrode surface usually remains constant. However, this technique, too, has a disadvantage which consists in the need to preconcentrate gallium so as to bring its level in the electrolyte to 2 or 3 g/lit, while it is common knowledge that gallium concentration is an ineffective operation involving considerable process losses.

It is also currently known in the art to employ a process for the extraction of gallium from the sodium aluminate liquors produced in the Bayer process by precipitation with finely distributed (finely comminuted) aluminum (see, for example, U.S. Pat. No. 3,170,875). According to this method, aluminum is to be added in a quantity sufficient for the formation of a gallium-aluminum alloy wherefrom the gallium is recovered chemically or electrochemically. However, the use of finely divided aluminum to extract gallium involves a high rate of consumption of the cementing agent, viz. aluminum. Another disadvantage of the latter known method consists in the need to follow the cementation operation with the decomposition of the product gallium-aluminum alloy to recover the gallium thereof.

SUMMARY OF THE INVENTION

It is an object of the present invention to obviate the foregoing disadvantages.

The present invention contemplates providing a process for the extraction of gallium which enables metallic gallium to be recovered directly from sodium aluminate liquors, thereby simplifying the procedure for effective recovery of gallium from sodium aluminate liquors, both high and low in gallium, and giving gallium in a higher degree of purity as compared with the prior art techniques.

Accordingly, there is provided a process for the extraction of gallium from sodium aluminate liquors by cementation from the liquors at an elevated temperature with stirring followed by gallium recovery, wherein, in accordance with the present invention, the cementation procedure is carried out by use of a liquid gallium-aluminum alloy containing from 0.2 to 6.0% aluminum by weight.

The method of this invention offers a simple procedure for the extraction of gallium at an earlier stage of bauxite processing, one that is organically associated with the production of alumina, which permits extracting gallium directly from sodium aluminate liquors of practically any composition; using high- and low-gallium raw materials; raising the purity of the product gallium and the gallium recovery ratio; speeding up the process of gallium extraction; and improving the economics of the gallium production procedure.

In accordance with the present invention, the cementation of gallium is preferably effected by use of a liquid gallium-aluminum alloy containing from 0.4 to 4.0% aluminum by weight.

The latter gallium-aluminum alloy enables gallium to be effectively extracted by cementation directly from both ordinary and gallium-enriched sodium aluminate liquors.

In accordance with the present invention, the cementation of gallium is preferably effected by use of a liquid gallium-aluminum alloy containing from 1.0 to 3.0% aluminum by weight.

The latter gallium-aluminum alloy enables gallium to be effectively extracted by cementation from gallium-enriched sodium aluminate liquors.

Also, in accordance with the present invention, the cementation of gallium is preferably effected by use of a liquid gallium-aluminum alloy containing from 0.5 to 2.0% aluminum by weight.

The latter gallium-aluminum alloy enables gallium to be extracted from sodium aluminate liquors containing up to 330 g/lit of $Na_2O$.

Furthermore, in accordance with the present invention, the cementation of gallium is preferably effected by use of a liquid gallium-aluminum alloy containing from 0.2 to 1.0% aluminum by weight.

The latter gallium-aluminum alloy enables gallium to be effectively extracted directly from sodium aluminate liquors as well as from liquors freed from vanadium compounds and other impurities by crystallization or calcium oxide treatment.

An alternative embodiment of the present invention comprises cementing gallium by adding the entire quantity of liquid gallium in a single batch to the sodium aluminate liquor and subsequently adding aluminum in portions to the emerging liquid gallium-aluminum alloy in the sodium aluminate liquor.

With the stages of gallium cementation from the liquor and preparation of the liquid alloy required for cementation being combined into one, the labor-consuming operations involved in the replacement of the aluminum-depleted liquid gallium-aluminum alloy can be dispensed with, permitting a much faster rate of the gallium extraction process.

Still another embodiment of the present invention comprises cementing gallium by adding the whole gallium-aluminum alloy in a single batch to the sodium aluminate liquor, with aluminum and gallium being subsequently periodically added to the sodium aluminate liquor.

The foregoing procedure is an effective way of recovering gallium at a lower rate of aluminum consumption for the reduction of gallium ions directly from the sodium aluminate liquors produced in the Bayer process or in the Bayer sintering process, the most wide-spread procedures for the processing of alumina-containing raw materials.

In accordance with the present invention, it is preferred that the periodic aluminum supply should be effected at a reduced negative potential of the gallium-aluminum alloy.

The latter technique permits stabilizing the predetermined conditions of gallium cementation from the sodium aluminate liquors and achieving the most efficient utilization of aluminum for the reduction of gallium ions from the feedstock sodium aluminate liquors.

It is further preferred, in accordance with the present invention, that, prior to the stage of gallium cementation from the sodium aluminate liquor produced in the Bayer process, the recycle sodium aluminate liquor should be cooled to a temperature at which the soda crystallizes and the vanadium is retained in the liquor, after which the crystallized product should be separated, the residual liquor mixed with the mother sodium aluminate liquor in the ratio of 0.1–1 to 1–0.1, the resultant liquor cooled to ambient temperature, and the vanadium precipitate separated.

The prestripping of the feedstock sodium aluminate liquors of vanadium, phosphorus, fluorine, arsenic compounds, soda and organic substances improves the cementation recovery ratio and the grade of the product gallium, reduces the rate of aluminum consumption per unit of gallium recovered, and permits comprehensive utilization of the feedstock to produce gallium and vanadium compounds simultaneously.

In accordance with the present invention, the recycle sodium aluminate liquor produced in the Bayer process is preferably cooled to a temperature of from 58 to 65° C.

The cooling of the recycle sodium aluminate liquors to the temperature in the above range conduces to a maximum degree of separation of soda, arsenic, fluorine and organic compounds and also prevents vanadium separation, so that at the second stage of cooling of the mixture of the recycle and mother liquors a precipitate of vanadium compounds can be produced with a high level of vanadium and with an insignificant level of impurities.

Furthermore, in accordance with the present invention, in order that the vanadium compounds may be precipitated as fully as possible, the residual liquor is preferably mixed with the mother liquor in the ratio of 0.9–0.5 to 1.

The above ratio of the liquors being mixed permits effective stripping of the sodium aluminate liquor produced in the Bayer process of vanadium and phosphorus compounds.

DETAILED DESCRIPTION OF PREFERRED EMBODIMENTS

Further objects and advantages of the present invention will be apparent to those skilled in the art from the following detailed description of the proposed process for recovering gallium from sodium aluminate liquors and several exemplary embodiments thereof.

In accordance with the present invention, gallium is to be cemented from sodium aluminate liquors by use of a liquid gallium-aluminum alloy referred to hereinafter as an aluminum gallama.

The method of gallium cementation with an aluminum gallama is based on the difference of normal potentials between the systems $Al/Al(OH)_4^- = -2.35$ v and $Ga/Ga(OH)_4^- = -1.22$ v.

However, the process of gallium cementation with solid aluminum has two disadvantageous features prohibitive to the practical application of the method: (a) the reaction proceeds at an extremely slow rate; and (b) the aluminum consumption rate is inordinately high, running into a thousand percent or more of the theoretically required quantity (due to the competitive process of hydrogen liberation which goes on simultaeneously with gallium reduction).

The kinetics and mechanism of cementation of gallium with an aluminum gallama were studied, and aluminum gallamas were investigated electrochemically and microscopically.

The aluminum gallama was prepared by directly reacting gallium and aluminum; aluminum was added with stirring to liquid gallium coated with a thin layer of the liquor being studied. The gallama thus obtained was introduced into the gallium-containing liquor under study. As the gallama was progressively depleted of aluminum, as indicated by gallama potential readings, it was withdrawn from the liquor, with a new batch of freshly prepared gallama added to the liquor instead.

The gallama decomposition phenomenon is based on its property to decompose water at normal temperature, releasing the aluminum into the solution to form a hydroxide, while the gallium remains in the metallic state.

Cementation is a purely electrochemical process. So, electrode polarization measurements of gallium-aluminum gallama galvanic pairs in liquors containing 0.11 and 2.0 g/lit of gallium and the Evans chart constructed in the course of these simulation studies showed that, as the concentration of gallium in the liquor increased, the horizontal portions of the cathode curves corresponding to the limiting diffusion current of gallate ions shifted toward higher electronegative values, the reason for which should be sought in the reduced concentration polarization values for gallium ion discharge. Under the foregoing set of conditions, the process of gallium cementation on the gallama proceeded under cathode control, the prevalent retarding influences being due to diffusion factors.

The effect of the intensity of agitation of the gallama and the liquor on the gallium recovery ratio was studied in the stirrer speed range from 0 to 760 rpm, with the liquor containing 0.25 g/lit of gallium and 150 g/lit of sodium oxide, at a temperature of 60° C.

It was found that as the speed of the stirrer went up from 0 to 7760 rpm at the set of conditions specified above, the degree of cementation rose from 16 to 99.5 percent.

Higher agitation speeds boosted the cathode and anode processes due to the enhanced diffusion of ions toward the active surface of the aluminum gallama.

Thus, if gallium is to be extracted effectively, the cementation procedure must be preferably effected with the liquor and the gallama being intensively stirred.

Studies into the effect of the liquor temperature on the gallium cementation process revealed that temperature increases had a favorable effect on the gallium reduction rate. At a higher temperature, the rate of diffusion increased so that the diffusion component of the absorption layer diminished, affording easier access for gallium ions to the interface.

However, higher liquor temperatures reduced over tension which prevents hydrogen liberation, thereby promoting the competitive process, viz. hydrogen reduction. But in the temperature range studied, from 30° to 80° C, the former factor was found to be more important than the latter one.

Consequently, if the gallium extraction process is to be speeded up, cementation must preferably be effected at an elevated temperature.

Electrochemical and structural studies of aluminum gallamas with different aluminum levels (from 0.2 to 6.0% by weight) indicated that the effectiveness of the cementation procedure by and large depended on the aluminum content of the gallama. Aluminum gallamas were found to be non-uniphase systems. Aluminum is partially dissolved in the alloy, but the major part of it obtains in a solid form gallium-plated on the surface. Therefore, in case of a low concentration of gallium ions in the catholyte and a large excess of aluminum, the latter is not fully utilized and the share of "free" aluminum taking no part in the gallium ion discharge rises. This aluminum is vigorously dissolved in an alkali liquor, liberating plenty of hydrogen which screens the gallama surface, hampering gallium ion discharge.

For this reason, if the sodium aluminate liquor employed in the process is low in gallium, e.g. from 0.15 to 0.5 g/lit, the gallamas used for cementation should preferably contain from 0.2 to 1.0% aluminum by weight.

It has been proved experimentally that, in order to effectively extract gallium by cementation with an aluminum gallama directly from ordinary and gallium-enriched sodium aluminate liquors, a liquid gallium-aluminum alloy containing from 0.4 to 4.0% aluminum by weight should preferably be used.

Should the sodium aluminate liquors used happen to be relatively high in gallium (e.g. containing from 1 to 5 g/lit of gallium), which is the case if such liquors are produced by combined processing of sodium aluminate liquors and gallium-containing sludge, the gallama should preferably contain from 0.5 to 2.0% aluminum by weight, since the proportion of aluminum expended on the reduction of gallate-aluminum which reduces gallate ions rises with the concentration of gallium ions in the solution.

Should gallium be cemented from sodium aluminate liquors rich in gallate ions, the process proceeding in the kinetic range and being limited by its intrinsic reaction of electrochemical ion reduction, it is preferred that the gallamas employed should contain from 1 to 3% aluminum by weight or even more.

In accordance with the present invention, to speed up the process and obviate the labor-consuming operation involved in the replacement of aluminum-depleted gallama, the gallama preparation and gallium cementation processes are combined into one.

The method of preparing a gallama directly in the cementation unit consists in feeding aluminum in the form of pellets, rods or shavings in periodic batches into the unit containing the sodium aluminate liquor and liquid gallium, the feeding operation being effected with the stirrer operating. The aluminum sinks by gravity through the sodium aluminate layer and is stirred into the gallium, forming a gallama. The gallium-aluminum ratio is monitored by the magnitude of the electrode potential of the gallama measured by the conventional compensation method.

It is a well known fact that the potential of a gallama depends on the level of dissolved aluminum in the alloy used. As the level of aluminum in the gallama diminishes, its potential shifts toward positive values.

The maximum potential of a gallium-aluminum alloy, which depends, e.g. on the aluminum level in the gallama, the composition of the liquor or the temperature, lies between −1.8 and −1.9 v, and the potential of pure gallium under such conditions is approximately between −1.3 and −1.4 v.

In accordance with the present invention, the periodic feeding of aluminum into the gallama in the course of gallium cementation from the sodium aluminate liquors should be effected at a reduced negative potential of the gallama in the liquor but still more negative than that of pure gallium under these conditions.

The proposed method of feeding aluminum into the gallama in the sodium aluminate liquor provides conditions under which the gallama aluminum is optimally utilized for the contact reduction of gallium ions. Also, in this case it is easy to maintain a predetermined aluminum level in the gallama in the course of gallium cementation with the aluminum gallama from the sodium aluminate liquors.

Gallium cementation from the sodium aluminate liquor is either effected on one and the same gallama which serves as the base of the cementing alloy, or successively on several gallamas, which enables a higher-grade gallium to be obtained on one of the gallamas and allows of a continuous and prolonged process of cementation easily amenable to automation.

The proposed process enables gallium to be extracted at an earlier stage of processing alumina-containing products to alumina. The process of this invention allows dispensing with a number of gallium concentration procedures and, hence, with the attendant losses of gallium which are otherwise inevitable in the processing of the gallium amalgam (sodium amalgam cementation) and the gallium-aluminum alloy (finely distributed aluminum cementation). The proposed method makes it possible to extract gallium directly from sodium aluminate liquors, thus presenting a simpler procedure than the prior art processes.

The gallium recovery ratio and the extraction rate are both improved owing to the intensive agitation of the catholyte which eliminates diffusion resistance; this is possible thanks to the liquid alloy employed which contains an electronegative component, viz. aluminum, at each point thereof.

Experiments indicate that aluminum prevents dissolution of the gallium alloy base in the liquor even if the gallium undergoes dispersion, as is the case sometimes if the liquor is vigorously agitated.

Hence, in accordance with the present invention, the gallium cementation procedure is effected by adding to the sodium aluminate liquor a gallium-aluminum alloy in a single batch after which aluminum is periodically added to the gallama in the sodium aluminate liquor. The time of aluminum supply into the gallama in the sodium aluminate liquor is determined by the alloy potential which is set as one of the process conditions depending on the composition of the feedstock sodium aluminate liquor. The pattern of variation of the gallama potential and the sequence of aluminum supply have been described hereabove.

Alternatively, aluminum may be supplied in a continuous manner. In such a case care should be taken that the quantity of aluminum supplied equals the quantity of aluminum lost from the gallama over the same period of time.

Practice of the present invention includes effecting cementation either on one and the same gallium from which a liquid gallium-aluminum alloy is successively prepared several times, or else by passing the feedstock liquor through 2 to 4 or more isolated liquid gallium-aluminum alloys.

Successive cementation of gallium on several liquid gallium-aluminum alloys permits combining the gallium extraction and purification steps: the bulk of impurities (vanadium and others remaining in the cooled liquor) is recovered together with gallium on the upstream gallamas, and a higher-grade gallium is obtained on the downstream gallamas, thus, a continuous cementation process readily lending itself to automation and capable of running for a long time is quite feasible.

Gallium cementation with an aluminum gallama can be used to extract gallium from liquors containing practically any amounts of gallium. Upon completion of cementation, the residual level of gallium in the solution may be as low as 0.04 g/lit. or even less.

The gallium produced by aluminum gallama cementation is at least one order of magnitude purer than that produced in any prior art process.

The reason for this exceptional degree of purity should be sought in the fact that metallic aluminum combines with the impurities contained in the gallium; owing to the high aluminum concentration gradient in the lye liqour and in the metallic gallium, these impurities gravitate toward the gallium-liquor interface where they form "associations" inert to gallium and consequently unable to pass back into the liquor, resulting in an effective separation of gallium from the impurities, i.e. purification.

The sodium aluminate liquors produced, for instance, in the Bayer aluminum oxide process contain, alongside gallium, numerous impurities including vanadium, phosphorus, arsenic and fluorine compounds as well as organic substances.

The proposed process permits, along with producing gallium, the recovery of the vanadium compounds as an independent product suitable for the manufacture of industrial- or chemical-grade vanadium pentoxide.

Studies of the process of electrochemical extraction of gallium and vanadium revealed that vanadate ions and solid products of vanadium reduction present in sodium aluminate liquors adversely affected the gallium extraction efficiency.

It is a commonly known fact that vanadate ions are more electropositive than gallate ions and are thus reduced at a faster rate. Gallate ions can be reduced in the presence of vanadate ions, but only at a high rate of consumption of the cementing agent; at a high level of vanadium in the liquor, part of the recovered gallium is likely to pass back into the solution, so that additional quantities of the cementing agent are called for to recover the gallium of the sodium aluminate liquor.

Therefore, to raise the efficiency of gallium cementation from sodium aluminate liquors and to achieve the highest possible vanadium recovery ratio as an independent product, we have developed a procedure which comprises preliminary (prior to gallium cementation) recovery of vanadium and other impurities from the feedstock sodium aluminate liquors.

We studied the process of crystallization of vanadium compounds from sodium aluminate liquors and investigated the physics and chemistry of certain phenomena which accompany vanadium crystallization.

We obtained solubility isotherms at 20, 30, 45, 60 and 75° C. in the $Na_2O—Al_2O_3—V_2O_5—H_2O$ system and found that the solubility of vanadium pentoxide in sodium aluminate liquors largely depended on the lye concentration and on the temperature, whereas the aluminum oxide concentration in the starting liquors was found to have practically no effect on the solubility of vanadium pentoxide.

Our data on vanadium solubility in sodium aluminate liquors at a temperature of 20° C. indicate that at a concentration of sodium oxide from 12 to 36.5 percent the solubility is farily low, from 0.3 to 0.4% $V_2O_5$. The solubility peak at 7.48% $V_2O_5$ is observed at a sodium oxide concentration of 8.46%. As the temperature rises to 45° C., at sodium oxide concentrations of 20% and higher, the solubility of vanadium pentoxide rises insignificantly, amounting to 0.35 to 0.8%. At a sodium oxide concentration below 20%, the solubility of vanadium pentoxide sharply rises: thus, at a sodium oxide concentration of 10.27%, it equals 24.32% $V_2O_5$.

The maximum solubility of vanadium pentoxide (35.24%) in sodium aluminate liquors is observed at a sodium oxide concentration of 18.4% and a temperature of 75° C.

The varying solubility of vanadium pentoxide in sodium aluminate liquors in the foregoing range of sodium oxide concentrations, from 8.46 to 36.5%, and at temperatures between 20° and 75° C. is accounted for by the emergence in the bottom phase of vanadates, vanadium compounds distinguished by virtue of their specific physicochemical properties.

Studies of the equilibrium bottom phases in the $Na_2O—Al_2O_3—V_2O_5—H_2O$ system by the chemical, X-ray diffraction, crystallographic orientation, thermographic and IR-spectroscopic methods revealed a number of sodium vanadate crystallohydrates and helped determine the range of existence of some of them: orthovanadates with 2, 5, 7, 10 and 12 water molecules; pyrovanadates with 18 and 22 water molecules; metavanadates with one and two water molecules; as well as anhydrous crystallohydrate. A sodium pyrovanadate with 22 molecules of water was discovered and investigated. The latter compound was found to be characterized by low-temperature thermal effects indicative of partial dehydration.

Our research into the degree of precipitation and size of the evolving sodium vanadate crystals depending on the levels of various impurities in sodium aluminate liquors, as well as our physicochemical study of reactions at room temperature in the five-component systems $Na_2O—Al_2O_3—V_2O_5$ ($NaF$, $P_2O_5$, $As_2O_5$, $Cr_2O_3$)—$H_2O$, constitute a significant advance toward a theory of crystallization of sodium vanadates from sodium aluminate liquors.

Thus, it was found, inter alia, that sodium fluoride, produced a strong inhibiting effect on the solubility of vanadium pentoxide in sodium aluminate liquors. Yet, the presence of sodium fluoride is undesirable for the crystallization process, for, along with sodium orthovanadate containing 12 water molecules, vanadium, under the set of conditions under study, combined with fluorine to form compounds such as $2Na_3VO_4 \cdot NaF \cdot 19H_2O$.

Phosphorus pentoxide was found to have no effect on the solubility of vanadium pentoxide. The crystallization precipitate contained this impurity because sodium orthovanadate and orthophosphate dodecohydrates formed mixed crystals.

The presence of arsenic in the crystallization of vanadium pentoxide from sodium aluminate liquors is undesirable because of the formation of mixed crystals of sodium orthovanadate and orthoarsenate dodecohydrates which hamper vanadium separation.

Trivalent chromium passes into the sodium aluminate liquor in very insignificant amounts and thus has no effect on the solubility of vanadium pentoxide.

Knowing the part played by the $NaF$, $P_2O_5$, $As_2O_5$ and $Cr_2O_3$ impurities in the course of vanadium pentoxide crystallization from sodium aluminate liquors as well as the relationship between the course of crystallization of sodium vanadates, on the one hand, and the temperature and concentration of sodium oxide in the liquor, on the other, we were able to improve the method of crystallization of vanadium compounds from the mother liquor mixed with the recycle liquor stripped of some impurities by cooling.

Prior to being admixed with the mother liquor (having a temperature of 45° C.), the recycle sodium aluminate liquor (having a temperature of 100° to 105° C.) is subjected to purification: the liquor is cooled from 100°–105° C. (at which the soda crystallizes and the vanadium is retained in the liquor) down to 58°–65° C., with the result that the soda, the sulphates, the fluorides, part of the phosphates, the organic substances and the arsenic compounds precipitate out. The losses of vanadium compounds with the impurity precipitate amount to 0.2–0.5% by weight of its level in the starting liquor. The crystallized precipitate is separated, the residual liquor is admixed with the mother sodium aluminate liquor in the ratio of 0.1–1 to 1–0.1, after which the mixture is cooled from the initial temperature of 53° C. down to 20°–25° C. (ambient temperature) and allowed to stand with continuous stirring, so that the vanadium compounds, part of the phosphorous compounds, the fluorides and other impurities precipitate out. The crystallized precipitate of vanadium compounds is separated from the solution.

In order to determine an optimal ratio at which the recycle and mother sodium aluminate liquors are to be mixed, we studied the relationship between the initial sodium oxide concentration, on the one hand, and the recovery ratio of vanadium compounds in the precipitate as well as the quantity of precipitating phosphorus and fluorine compounds, on the other hand.

It was established that a rise in the initial sodium oxide concentration from 145.8 to 281.4 g/lit. caused a rise in the vanadium recovery ratio from 46.2 to 83.8% by weight, respectively, the crystallization proceeding at room temperature (20° C.). It should further be noted that by far the highest vanadium recovery ratio was observed at a sodium hydroxide concentration of from 170 to 200 g/lit.

Moreover, higher initial lye concentrations in the liquor and longer crystallization times were found to have a significant boosting effect on the rate of coprecipitation of the soda, the organic substances as well as the phosphorus, fluorine and arsenic compounds. As vanadium compounds were progressively enriched with impurities, the vanadium concentration dropped from 13 to 3% by weight, which subsequently obstructed its processing to vanadium pentoxide. Hence, sodium oxide concentrations in excess of 200 g/lit. are undesirable in crystallization, because otherwise, while the vanadium recovery in the concentrate rises by a maximum of 6% by weight, the rate of coprecipitation of the impurities increases 2- or 3-fold.

Therefore, in order to assure a higher recovery ratio of vanadium compounds, simultaneously minimizing the impurity coprecipitation phenomenon, the residual liquor (recycle liquor after cooling) is admixed with the mother sodium aluminate liquor in the ratio of 0.9–0.5 to 1.

Should the feedstock sodium aluminate liquor contain a low level of vanadium, the prepurification of the liquor may be confined to just one (primary) stage of cooling of the recycle liquor to eliminate the soda, fluoride, arsenic and organic constituents thereof.

In accordance with the invention, gallium is cemented from the sodium aluminate liquors of the Bayer aluminum oxide process both directly from the feedstock liquor and with the latter being prepurified, the efficiency of the process and its economics being determined, as has been mentioned above, by the liquor composition and, above all, by the level of vanadium therein.

The process of this invention likewise comprises a possibility of cementing gallium from a mixture of the liquors produced in the Bayer sintering process as well as from practically any gallium-containing solution.

EXAMPLE 1

Liquid gallium, the base of a cementation alloy, was added to 1 cu.m. of a sodium aluminate liquor containing 50 g/lit of sodium oxide and 0.35 g/lit of gallium. Gallium extraction by cementation was effected by use of a liquid gallium-aluminum alloy containing 1.0% aluminum by weight and 99.0% gallium by weight, the procedure being effected with stirring at a temperature of 60° C. The liquid gallium-aluminum alloy was prepared by periodically adding aluminum to the gallium in the sodium aluminate liquor at a potential of 1.55V. The cementation of gallium from the liquor lasted 8 hours, after which the sodium aluminate liquor was replaced by a fresh portion of the liquor of the same composition and the cementation resumed. After the replacement procedure had been repeated 15 times, the product gallium and the gallium-containing sludge were withdrawn from the unit, and the metal was separated from the sludge by filtration. The process yielded 3.7 kg of gallium containing the following impurities, wt.%: copper, $1.1 \cdot 10^{-3}$; aluminum, $1.7 \cdot 10^{-4}$; magnesium, $1.4 \cdot 10^{-5}$; iron, $5.1 \cdot 10^{-5}$; silicon, $5.3 \cdot 10^{-5}$; tin, $1.10^{-2}$; zinc, $2.10^{-2}$; manganese, $1.1 \cdot 10^{-4}$; cadmium, $3.1 \cdot 10^{-4}$. In addition, 0.44 kg of gallium-containing sludge (0.41 kg of gallium) was produced. The metallic gallium was subjected to purification, while the gallium-containing sludge was subjected to processing for recovering the gallium by a known technique. The total yield of gallium was 4.09 kg.

EXAMPLE 2

Liquid gallium was added to 1 liter of a sodium aluminate liquor containing 150 g/lit of sodium oxide and 1.94 g/lit of gallium. Gallium extraction by cementation was effected by use of a liquid gallium-aluminum alloy containing 0.5% aluminum by weight and 99.5% gallium by weight, the procedure being carried out with stirring at 750 rpm at a temperature of 80° C. The liquid gallium-aluminum alloy was prepared by periodically adding aluminum to the gallium in the sodium aluminate liquor at an alloy potential of 1.6 V. The gallium cementation procedure lasting 50 minutes yielded 1.77 kg of gallium containing the following impurities, wt.%, copper, $1.5 \cdot 10^{-4}$; aluminum, $5 \cdot 10^{-4}$; magnesium, $3 \cdot 10^{-5}$; silicon, $5 \cdot 10^{-5}$ and tin, $3 \cdot 10^{-4}$; nickel not found. Also, 0.166 g of a gallium-containing sludge with 90% gallium by weight was produced. The overall quantity of gallium recovered was 1.919 g.

EXAMPLE 3

Liquid gallium was added to 1 liter of a sodium aluminate liquor containing 300 g/lit of sodium oxide and 150 g/lit of gallium. Gallium extraction by cementation was effected by use of a liquid gallium-aluminum alloy containing 6.0% aluminum by weight and 94.0% gallium by weight, the procedure being carried out with stirring at 500 rpm at a temperature of 70° C. The liquid gallium-aluminum alloy was prepared by adding aluminum to the gallium in the sodium aluminate liquor at an alloy potential of 1.7 V. 3.5 hours of cementation yielded 145.5 g of gallium containing the following impurities, wt.%: copper, $1.10^{-4}$ aluminum, $2 \cdot 10^{-4}$; magnesium, $1.10^{-5}$; silicon, $4 \cdot 10^{-5}$; tin, $1 \cdot 10^{-4}$, as well as 3.3 g of sludge containing 2.97 g of gallium. The overall quantity of gallium recovered was 148.33 g.

EXAMPLE 4

A gallium-aluminum alloy containing 1.0% aluminum by weight and 99.0% gallium by weight was added to 1 liter of a sodium aluminate liquor containing 200 g/lit of sodium oxide and 100 g/lit of gallium. Gallium extraction by cementation was effected by use of a liquid gallium-aluminum alloy containing 3.0% aluminum by weight and 97.0% gallium by weight, the procedure being carried out with stirring at 500 rpm at a temperature of 60° C. 3.75 hours of cementation yielded 97.8 g of gallium and 2.2 g of sludge containing 2.0 g of gallium. The overall quantity of gallium recovered was 99.8 g.

EXAMPLE 5

13,000 lit (13 cu.m.) of a recycle sodium aluminate liquor produced in the Bayer aluminum oxide process, having a temperature of 102° C. and containing the following constituents, g/lit: sodium oxide, 302.8; sodium hydroxide, 270; aluminum oxide, 126.5; gallium, 0.48; vanadium pentoxide, 1.56; phosphorus pentoxide, 0.8; silicon oxide, 1.03; arsenic pentoxide, 0.18; fluorine, 1.9; and iron oxide, 0.05, was cooled down to 58° C., and the soda, arsenic, fluorine and iron compounds as well as organic substances were separated from the liquor by filtration. The residual liquor in the amount of 9 cu.m. was admixed with 10 cu.m. of the Bayer process mother liquor having a temperature of 45° C. and containing the following constituents, g/lit: sodium oxide, 150; sodium hydroxide, 132; aluminum oxide, 61.7; gallium, 0.25; vanadium pentoxide, 0.75; phosphorus pentoxide, 0.54; fluorine, 1.3; iron oxide, 0.02; and silicon oxide, 0.40.

The resultant liquor was cooled down to room temperature, causing the vanadium compounds containing 19% vanadium pentoxide by weight to precipitate out. The purified liquor containing 0.15 g/lit of vanadium pentoxide was continuously passed at a rate of 15 cu.m./24 hr successively through four isolated gallamas. Gallium cementation was effected by use of a liquid gallium-alluminum alloy made up of 0.8% aluminum by weight and 99.2% gallium by weight, the procedure being carried out with stirring at a temperature of 60° C. Aluminum was supplied into each gallama at an alloy potential of 1.70 V. 24 hours of cementation yielded 2.38 kg of gallium containing the following impurities, wt.%: copper, $1.1 \cdot 10^{-3}$; aluminum, $4.5 \cdot 10^{-3}$; magnesium, $3 \cdot 10^{-5}$; iron, $2.1 \cdot 10^{-3}$; silicon, $2 \cdot 10^{-3}$; zinc, $1 \cdot 10^{-1}$; tin, $9 \cdot 10^{-3}$, as well as 0.64 kg of sludge containing 0.59 kg of gallium (93% by weight). The overall quantity of gallium recovered amounted to 2.93 kg.

EXAMPLE 6

15 cu.m. of a recycle sodium aluminate liquor produced in the Bayer process, having a temperature of 100° to 105° C. and containing 290 g/lit of sodium oxide, 0.47 g/lit of gallium and 1.5 g/lit of vanadium pentoxide, was cooled down to 60° C.; a crystallized precipitate of soda, arsenic, fluorine and iron compounds as well as organic substances was separated; the residual liquor in the amount of 10 cu.m. was admixed with 10 cu.m. of a Bayer process mother liquor containing 130 g/lit of sodium oxide, 0.25 g/lit of galliuim and 0.7 g/lit of vanadium pentoxide; cooled down to room temperature; and a crystallized precipitate of vanadium compounds was separated. The purified liquor was continuously passed at a rate of 15 cu.m. per 24 hours successively through four isolated gallamas. Gallium extraction by cementation was effected by use of a liquid gallium-aluminum alloy containing 0.4% aluminum by weight and 99.6% gallium by weight, the procedure being carried out with stirring at a temperature of 60° C. Aluminum was supplied into each gallama at an alloy potential of 1.72 V. 24 hours of cementation yielded 2.16 kg of gallium and 0.580 kg of sludge containing 0.54 kg of gallium (93% by weight). The overall quantity of gallium recovered was 2.675 kg.

EXAMPLE 7

0.5 lit of a recycle sodium aluminate liquor produced in the Bayer process, having a temperature of 105° C. and containing 300 g/lit of sodium oxide and 0.49 g/lit of gallium, was cooled down to 58° C; a crystallized precipitate of soda, arsenic, fluorine and iron compounds as well as organic substances was separated; the residual liquor in the amount of 0.1 lit was admixed with 1 lit of a Bayer process mother liquor containing 128 g/lit of sodium oxide and 0.25 g/lit of gallium, cooled down to room temperature and a crystallized precipitate was separated. Liquid gallium was added to the filtered liquor in the amount of 1 lit. Gallium extraction by cementation was effected by use of a liquid gallium-aluminum alloy containing 0.2% aluminum by weight and 99.8% gallium by weight, the procedure being carried out with stirring at 750 rpm at a temperature of 60° C. The liquid gallium-aluminum alloy was prepared by adding aluminum at an alloy potential of 1.73 V. 50 minutes of gallium cementation yielded 0.17 g of gallium and 0.022 g of sludge containing 0.02 g of gallium. The overall quantity of gallium recovered amounted to 0.19 g.

EXAMPLE 8

1.5 lit of a recycle sodium aluminate liquor produced in the Bayer process and containing 297g /lit of sodium oxide and 0.49 g/lit of gallium was cooled down to a temperature of 60° C.; a crystallized precipitate of soda, arsenic, fluorine and iron compounds as well as organic substances was separated; the remaining 1 lit of the liquor was admixed with 0.1 l of a Bayer process mother liquor containing 128 g/lit of sodium oxide and 0.25 g/lit of gallium; the mixture of the liquors thus produced was cooled down to room temperature; and a crystallized precipitate was separated. The filtered solution in the amount of 1 lit was directed to cementation. To this end, metallic gallium was first fed into the liquor. Gallium extraction by cementation was effected by use of a liquid gallium-aluminum alloy containing 0.5% aluminum by weight and 99.5% gallium by weight with stirring at 760 rpm at a temperature of 60° C. Aluminum was supplied at a gallama potential of 1.69V. 60 minutes of cementation yielded 0.264 g of gallium and 0.072 g of sludge containing 0.065 g of gallium (96% by weight). The overall quantity of gallium recovered amounted to 0.326 g.

EXAMPLE 9

1.5 lit of a recycle sodium aluminate liquor produced in the Bayer process and containing 297 g/lit of sodium oxide and 0.5 g/lit of gallium was cooled down to a temperature of 60° C; a crystallized precipitate of soda, arsenic, fluorine and iron compounds as well as organic substances was separated; the remaining liquor in the amount of 1 lit was subjected to gallium extraction by cementation. The latter procedure was effected by use of a liquid gallium-aluminum alloy containing 0.5% aluminum by weight and 99.5% gallium by weight with stirring at 750 rpm at a temperature of 70° C. The liquid alloy was prepared by periodically adding aluminum to the liquor at a gallama potential of 1.7 V. 75 minutes of cementation yielded 0.28 g of gallium and 0.09 g of sludge containing 0.07 g of gallium (99.5% by weight). The overall quantity of gallium recovered amounted to 0.347 g.

EXAMPLE 10

1.5 lit of a recycle sodium aluminate liquor produced in the Bayer process and containing 281 g/lit of sodium oxide and 0.48 g/lit of gallium was cooled down to a temperature of 60° C.; a crystallized precipitate of soda, arsenic, fluorine and iron compounds as well as organic substances was separated; the remaining liquor in the amount of 1 lit was admixed with 0.5 lit of a Bayer process mother liquor containing 126 g/lit of sodium oxide and 0.24 g/lit of gallium; the resultant liquor was cooled down to room temperature; and a crystallized precipitate of vanadium and other compounds was separated. The filtered liquor in the amount of 1 lit was subjected to cementation, for which purpose a gallium-aluminum alloy containing 0.7% by weight of aluminum was added to the liquor. Gallium extraction by cementation was effected by use of a liquid gallium-aluminum alloy containing 0.6% aluminum by weight and 99.4% gallium by weight, the procedure being carried out with stirring at 760 rpm at a temperature of 60° C. Aluminum was supplied into the gallama at a potential of 1.68 V. 55 minutes of cementation yielded 0.22 g of gallium and 0.07 g of sludge containing 0.056 g of gallium. The overall quantity of gallium recovered amounted to 0.273 g.

EXAMPLE 11

10 cu.m. of a recycle sodium aluminate liquor produced in the Bayer process and containing 301 g/lit of sodium oxide and 0.49 g/lit gallium was cooled down to 58° C.; a crystallized precipitate of soda, arsenic, fluorine and iron compounds as well as organic substances was separated; the residual liquor in the amount of 7 cu.m. was admixed with 14 cu.m of a Bayer process mother liquor containing 150 g/lit of sodium oxide and 0.25 g/lit of gallium; the resultant mixture was cooled down to room temperature; and a crystallized precipitate of vanadium and other compounds was separated. The purified liquor was passed continuously through four isolated gallamas at a rate of 15 cu.m. per 24 hours. Gallium extraction by cementation was effected by use of a liquid gallium-aluminum alloy containing 0.5% aluminum by weight and 99.5% gallium by weight, the procedure being carried out with stirring at a temperature of 60° C. 24 hours of cementation of gallium from the liquor yielded 1.98 kg of gallium and 0.550 kg of sludge containing 0.496 kg of gallium. The overall quantity of gallium recovered amounted to 2.454 kg.

EXAMPLE 12

2 cu.m. of a recycle sodium aluminate liquor produced in the Bayer process and containing 295 g/lit of sodium oxide and 0.475 g/lit of gallium was cooled down to a temperature of 65° C.; a crystallized precipitate of soda, arsenic, fluorine and iron compounds as well as organic substances was separated; the residual liquor in the amount of 0.7 cu.m. was admixed with 1 cu.m. of the Bayer process mother liquor containing 130 g/lit of sodium oxide and 0.25 g/lit of gallium; the resultant mixture was cooled down to room temperature; and a crystallized precipitate of vanadium compounds was separated. As aluminum gallama containing 0.6% aluminum by weight was added to the filtered liquor amounting in quantity to 1 cu.m. Gallium extraction by cementation was effected by use of a liquid alloy containing 1.0% aluminum by weight and 99% gallium by weight. Aluminum was added to the gallama at a potential of 1.7 V. 10 hours of cementation from the liquor yielded 0.137 kg of gallium and 0.040 kg of sludge containing 0.034 kg of gallium. The overall quantity of gallium recovered amounted to 0.170 g.

EXAMPLE 13

Liquid gallium was supplied into a mixture of mother sodium aluminate liquors produced in the Bayer process and in the sintering process and containing 121 g/lit of sodium oxide and 0.20 g/lit of gallium. Gallium extraction by cementation was effected by use of a liquid alloy containing 1.0% aluminum by weight and 99% gallium by weight. The liquid alloy was prepared by periodically supplying aluminum into the gallium in the sodium aluminate liquor at a potential of 1.68 V. 100 minutes of gallium cementation from the liquor yielded 0.152 g of gallium.

EXAMPLE 14

A gallium-aluminum alloy containing 1.0% aluminum by weight was added to 1 cu.m. of a sodium aluminate liquor containing 80 g/lit of sodium oxide and 0.35 g/lit of gallium. Gallium extraction by cementation was effected by use of a liquid gallium-aluminum alloy containing 0.9% aluminum by weight and 99.1% gallium by weight, the procedure being carried out with stirring at a temperature of 65° C. The liquid alloy was prepared by periodically adding aluminum to the gallium in the sodium aluminate liquor at a potential of 1.58 V. After 8 hours of cementation, the liquor was withdrawn from the cementation unit and replaced by a fresh batch of the liquor of the same composition, whereupon the cementation was resumed under the same set of conditions. After 15 replacements of the spent liquor, the product gallium and the gallium-containing sludge were withdrawn from the unit, and the gallium was separated by filtration from the gallium-containing sludge. The process yielded 3.72 kg of gallium and 0.44 kg of sludge containing 0.408 kg of gallium. The metallic gallium was subjected to purification, while the gallium-containing sludge was processed by a known technique. The overall quantity of gallium recovered amounted to 4.128 kg.

EXAMPLE 15

A liquid gallium-aluminum alloy containing 1% aluminum by weight was added to 1 lit of a sodium aluminate liquor containing 150 g/lit of sodium oxide and 1.94 g/lit of gallium. Gallium extraction by cementation was effected by use of a liquid gallium-aluminum alloy containing 1.5% aluminum by weight and 98.5% gallium by weight, the procedure being carried out with stirring at 750 rpm at a temperature of 70° C. The liquid alloy was prepared by periodically adding aluminum to the gallama in the aluminate liquor at an alloy potential of 1.65 V. 43 minutes of cementation of gallium from the liquor yielded (90% by weight). The overall quantity of gallium recovered amounted to 1.92 g.

EXAMPLE 16

A liquid aluminum gallama containing 1% aluminum by weight was introduced into 1 lit of a sodium aluminate liquor containing 140 g/lit of sodium oxide and 100 g/lit of gallium. Gallium extraction by cementation was effected by use of a liquid gallium-aluminum alloy made up of 4.0% aluminum by weight and 96.0% gallium by weight, the procedure being carried out with stirring at 500 rpm at a temperature of 65° C. The liquid alloy was prepared by periodically supplying aluminum into the gallama in the sodium aluminate liquor at a potential of 1.7 V. The cementation yielded 96.1 g of galliumand 3.32 g of sludge containing 2.99 g of gallium (96% by weight). The overall quantity of gallium recovered amounted to 98.97 g.

EXAMPLE 17

Liquid gallium was added to 1 lit of a sodium aluminate liquor containing 135 g/lit of sodium oxide and 40 g/lit of gallium. Gallium extraction by cementation was effected by use of a liquid gallium-aluminum alloy containing 2.0% aluminum by weight and 98.0% gallium by weight. The liquid alloy was prepared by periodically adding aluminum to the gallama in the sodium aluminate liquor at a potential of 1.71 V. The cementation yielded 36.45 g of gallium and 2.9 g of sludge containing 2.71 g of gallium (95% by weight). The overall quantity of gallium recovered amounted to 39.02 g.

What is claimed is:

1. A process for extraction of gallium from sodium aluminate liquors comprising the steps of: contacting a feedstock sodium aluminate liquor with stirring at an elevated temperature with a liquid gallium-aluminum alloy containing from 0.2 to 6% aluminum by weight to cause gallium cementation from the liquor; and separating the gallium recovered by the cementation procedure from the sodium aluminate liquor.

2. The process for extraction of gallium from sodium aluminate liquors as claimed in claim 1, wherein the liquid gallium-aluminum alloy contains from 0.4 to 4.0% aluminum by weight.

3. The process for extraction of gallium from sodium aluminate liquors as claimed in claim 2, wherein the liquid gallium-aluminum alloy contains from 1.0 to 3.0% aluminum by weight.

4. The process for extraction of gallium from sodium aluminate liquors as claimed in claim 2, wherein the liquid gallium-aluminum alloy contains from 0.5 to 2.0% aluminum by weight.

5. The process for extraction of gallium from sodium aluminate liquors as claimed in claim 1, wherein the liquid gallium-aluminum alloy contains from 0.2 to 1.0% aluminum by weight.

6. The process for extraction of gallium from sodium aluminate liquors as claimed in claim 1, wherein the liquid gallium-aluminum alloy is prepared by introducing gallium into the feedstock sodium aluminate liquor to permit gallium cementation and then periodically introducing aluminum into the emerging liquid gallium-aluminum alloy in the sodium aluminate liquor.

7. The process for extraction of gallium from sodium aluminate liquors as claimed in claim 6, wherein the aluminum is periodically introduced at a reduced negative potential of the gallium-aluminum alloy.

8. The process for extraction of gallium from sodium aluminate liquors as claimed in claim 1, wherein the gallium-aluminum alloy is introduced into the feedstock sodium aluminum liquor to permit gallium cementation and further comprising periodically introducing aluminum into the gallium-aluminum alloy in the sodium aluminate liquor.

9. The process for extraction of gallium from sodium aluminate liquors as claimed in claim 8, wherein the aluminum is periodically introduced at a reduced negative potential of the gallium-aluminum alloy.

10. The process for extraction of gallium from sodium aluminate liquors as claimed in claim 1, wherein the feedstock sodium aluminate liquor is a recycle sodium aluminate liquor produced in the Bayer process and further comprising the steps of, prior to the gallium cementation step: cooling the recycle sodium aluminate liquor to a temperature at which soda of the liquor crystallizes while the vanadium component thereof is retained; separating the crystallized soda; admixing the liquor stripped of soda with a mother sodium aluminate liquor in the ratio of 0.1–1 to 1.0.1 cooling the admixed liquor to ambient temperature; and separating a vanadium precipitate from the cooled sodium aluminate liquor.

11. The process for extraction of gallium from sodium aluminate liquors as claimed in claim 10, wherein the recycle sodium aluminate liquor produced in the Bayer process is cooled down to a temperature between 58° to 65° C.

12. The process for extraction of gallium from sodium aluminate liquors as claimed in claim 10, wherein the liquor stripped of soda is admixed with the mother sodium aluminate liquor in the ratio of 0.9–0.5 to 1.

* * * * *